July 22, 1969   M. G. BECK   3,456,961

VEHICLE SPRING SUSPENSION

Original Filed Dec. 6, 1965

INVENTOR.
Merrill G. Beck
BY Ralph Hammar
Attorney

United States Patent Office 3,456,961
Patented July 22, 1969

3,456,961
VEHICLE SPRING SUSPENSION
Merrill G. Beck, Erie, Pa., assignor to Lord Corporation, Erie, Pa., a corporation of Pennsylvania
Continuation of application Ser. No. 511,896, Dec. 6, 1965. This application May 23, 1968, Ser. No. 739,968
Int. Cl. B60g 11/24
U.S. Cl. 280—124            3 Claims

ABSTRACT OF THE DISCLOSURE

A vehicle spring consisting essentially of a solid body of elastomer diverging outwardly at an acute angle from ends of reduced area and having a relation between height and cross section to prevent buckling under compression loads which may be deflected under compression loads to substantially half its height without failure because the load carrying area at the ends increases with the load.

---

This application is a continuation of S.N. 511,896, filed Dec. 6, 1965, now abandoned.

This invention is intended to reduce the weight and improve the performance of springs of load carrying vehicles by using compression type elastomeric mountings either as the sole spring or as an auxiliary spring.

Figure 1:
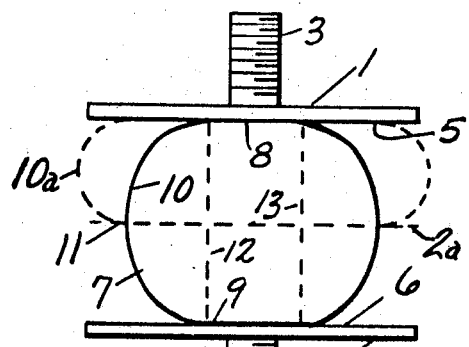
Figure 2:
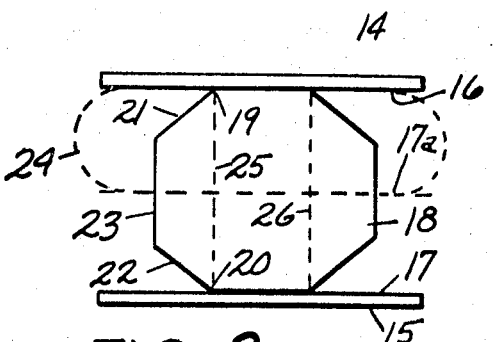
Figure 3:
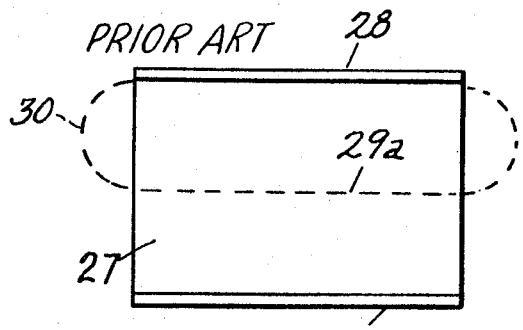
Figure 4:
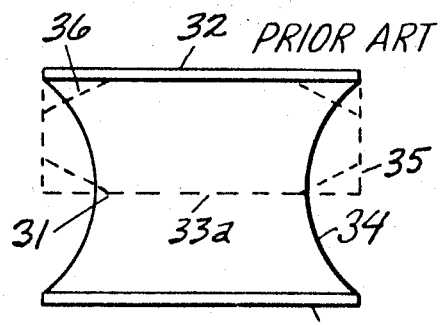
Figure 6:
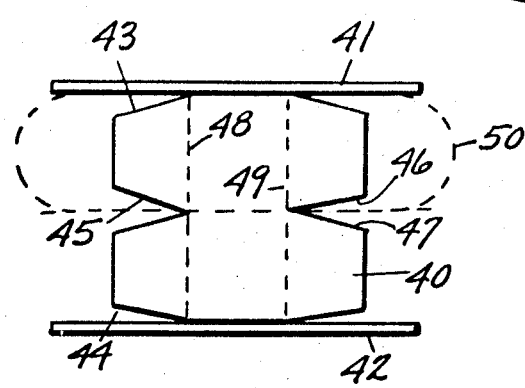
Figure 5:
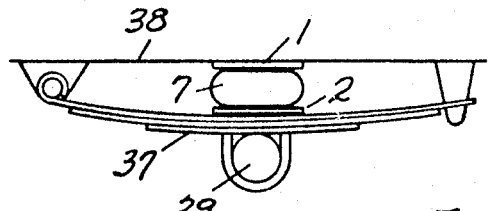

In the drawing, FIG. 1 is a side elevation of an elastomeric mounting, FIG. 2 is a side elevation of a modification, FIGS. 3 and 4 are diagrammatic views showing the prior art, FIG. 5 is a diagrammatic view showing the FIG. 1 mounting as an auxiliary vehicle spring, and FIG. 6 is a side elevation of a modification.

In the drawing, 1 and 2 indicates supporting and supported members provided with suitable attachment means such as studs 3, 4. The members 1 and 2 have load carrying surfaces 5 and 6 in opposed relation to each other. Between the surfaces 5 and 6 is a solid body 7 of elastomer having ends 8, 9 of reduced cross sectional area bonded to the central portions of the surfaces 5, 6. The bonding anchors the elastomer to the supporting and supported members in a precisely determined position with respect to the load carrying surfaces 5, 6. Between the ends 8, 9 the elastomer has an arcuate contour 10 reaching its maximum diameter 11 in the region midway or near midway between the ends. The elastomer provides a load supporting column between the supporting and supported members carrying the load in compression. In order to achieve stability, the height of the elastomeric column, that is the distance between the surfaces 5 and 6, is preferably not more than about twice the thickness of the column in the region between the ends. In order to obtain high load carrying ability, the height of the column is preferably at least about half the thickness at the central portion designated by the numeral 11.

When the FIG. 1 mounting is placed under vertical load, and deflected to substantially half its height, the member 2 moves to the relative position indicated by dotted line 2a and the arcuate contour of the elastomer assumes the position indicated by dotted line 10a. This amounts to a compression of the column of elastomer to substantially half its initial or unloaded height, a severe strain for ordinary compression type elastomeric mountings. Despite this strain, the mounting as shown in FIG. 1 has an exceptionally long life. In a test, no evidence of failure showed up after more than 100,000 cycles of such loading.

Several factors contribute to this improvement. Under load, the elastomer bulges outward or rolls over the plates. This action starts at light loads. The acute angle between the elastomer and the plates permits the elastomer to bulge or roll out over the bond edge before very much stress has built up at the edge of the bond between the elastomer and plates 1 and 2. Increasing the load still further causes little increase to stress or strain at the bond edge, primarily because the elastomer that has rolled over on the plate acts as a restriction. The elastomer that has rolled over on the plate now carries more load and the load carrying area is greater. This change occurs whenever the load is increased. Even at high loads, the region of highest stress and strain is the bulged outer exposed surface of the elastomer. But here again, stress concentrations are not severe because there is no specific restriction point to bulging.

The stiffness of the mounting increases with load so that a mounting which provides an adequate cushion for heavy load will not be too stiff for a light load. At light loads, the load is applied primarily through the reduced area sections 8, 9 and the stiffness is comparable with that of a column of elastomer between dotted lines 12, 13. As the load increases, the arcuate surfaces 10 roll outward into contact with the load carrying surfaces 5, 6, thereby increasing the cross section of elastomer in load carrying relation between the surfaces and correspondingly increasing the rigidity. This action of progressively increasing the contact area is essentially independent of the nature of the load carrying surfaces 5, 6. Essentially the same characteristics are obtained whether the surfaces 5, 6 are rough or smooth or whether lubricated or dry. Apparently, as soon as contact is made, the elastomer assumes a load carrying relation and there is essentially no tendency for the elastomer to slip along the surfaces. This may be due to the fact that the maximum stress intensity in the rubber is always in the peripheral surfaces midway between the ends of the body. The stress in this region is in the nature of hoop tension which acts in the direction to hold the incompressible rubber in contact with the load carrying surfaces 5, 6.

In the modification shown in FIG. 2, the supporting and supported members 14 and 15 have load carrying surfaces 16, 17 in opposed relation to each other. Between the surfaces 16 and 17 is a solid body 18 of elastomer having ends 19, 20 of reduced cross section bonded to the surfaces. The ends of the elastomer are bevelled as indicated at 21, 22 and the section 23 between the ends of the bevels is shown as straight, although this is not critical.

When deflected to substantially 50% of the height of the column, the load carrying surface 17 occupies the position indicated by dotted line 17a and the surfaces of the elastomer intermediate the load carrying surfaces assume the position indicated by dotted line 24. As in the FIG. 1 construction, it will be noted that the end surfaces of the elastomer outside the areas 19, 20 have in effect been laid down against the load carrying surfaces 16, 17 and the intermediate sections of the elastomer indicated by the numeral 23 have been bulged outwardly to the position indicated by the dotted line 24. The FIG. 2 mounting is equivalent to the FIG. 1 monuting but is somewhat easier to make. Initially, the stiffness is comparable to a column of elastomer between lines 25 and 26, providing the soft spring rate desirable for light loads. In the fully loaded condition indicated by line 24, the cross sectional area in load carrying relation between the surfaces 16 and 17 has increased substantially ten fold with a consequent increase in stiffness desirable for carrying heavy loads.

FIGS. 3 and 4 are diagrammatic views illustrating the performance of prior art compression type mountings.

In FIG. 3, a solid body 27 of elastomer is sandwiched between and bonded to supporting and supported members 28 and 29. When the mounting is loaded to bring the member 29 to the position shown by dotted line 29a, the elastomer bulges outwardly as indicated at 30 and rupture takes place in the regions near the outer edges of the members 28, 29. In these regions, the bond to the elastomer is placed under high stress.

FIG. 4 shows an attempt to protect the bond to the elastomer. In this construction, a solid body 31 of elastomer is sandwiched between and bonded to supporting and supported members 32 and 33. The outer edges of the body 31 are concave as indicated at 34. When the FIG. 4 mounting is loaded to bring the member 33 to the position indicated by dotted line 33a, the elastomer bulges outwardly as indicated by dotted line 35. In so doing, high stress is produced along bevelled lines 36 which result in rupture of the elastomer.

FIG. 5 shows the application of the FIG. 1 mounting to a vehicle spring. In this figure, a spring 37 is arranged between the vehicle frame 38 and axle 39. If the spring were the sole load carrying connection between the frame and axle, it would be heavy. In addition, at light loads, it would be so stiff as to amount practically to a rigid connection. For example, in a load carrying vehicle having a frame weighing 7,000 pounds and carrying a load of 70,000 pounds, the springs 37 needed to carry the load would weigh substantially 1200 pounds. In order to overcome these disadvantages and to decrease the weight, the spring 37 is made only heavy enough to carry the weight of the frame 38 and the load is carried by the mounting of FIG. 1 arranged in load carrying relation between the frame and axle. The spring 37 also performs the function of radius rods for holding the axle in place. By so doing, the overall weight of the spring suspension (e.g. the weight of the spring 37 plus the weight of the mounting 1, 2, 7) is reduced fro m1200 to 600 pounds and the performances improved because the elastomer provides adequate cushioning for all loads while the spring 37 if strong enough to carry the full load is too rigid for light loads. Either member 1 or 2 may be omitted and the body of elastomer allowed to make load carrying contact with a corresponding surface on either the frame or axle. Instead of making the members 1, 2 large enough to provide the entire loading surface, the plates may be made of small area and the large loading surface provided by some other means such as appropriate surfaces on the frame and axle illustrated in FIG. 5. A further decrease in weight may be obtained by holding the axle 39 in place with conventional radius rods and using the elastomeric mountings as the sole load carrying connection. With such a design, the members 1 and 2 could both be fixed to the frame and axle so the elastomer would resist rebound, although that is not necessary.

The FIG. 6 mounting is similar to FIGS. 1 and 2 in characteristics. It comprises a solid body 40 of elastomer bonded at opposite ends to end plates 41 and 42. The bond to the elastomer is protected by bevelled ends 43, 44 which diverge from the plates 41 and 42. Under load, the bevelled ends swing down into contact with the associated end plate and protect the bond. At the center of the body 40 is a groove 45 with diverging sides 46, 47 which close against each other under load.

Initially, the FIG. 6 mounting has a stiffness comparable with the column between dotted lines 48, 49. When deflected to substantially half its initial height, the elastomer assumes the position indicated by dotted line 50 in which it will be noted the bond between the elastomer and the end plates is completely protected.

To obtain long life at high strain, the following structural characteristics should be observed: First, the column of elastomer should have a relation between the length and cross section which will prevent buckling under compression (Applied Mechanics, Fuller and Johnston, vol. II, copyright 1919, pp. 21, 346–364). For a cylinder of uniform cross section the length or height should be no greater than twice the diameter. Buckling reduces the load carrying ability. Second, the cross sectional area of the column of elastomer effective for light loads (i.e. 12, 13 or 25, 26 or 48, 49) should be substantially less than, e.g. from one tenth to one half, the maximum cross sectional area between the ends. Third, the ends of the elastomer should diverge from the load carrying surfaces at an angle such that under load the elastomer swings or is laid down into contact with the load carrying surfaces. An average angle of from 15–45° is acceptable. For arcuate surfaces such as shown in FIG. 1, the angle should be measured midway between the ends of the arc. For mountings such as FIG. 6, the angle is measured between one of the sides 46, 47 and a plane parallel to the end plates. The included volume between the projection of the elastomer on the load carrying surfaces at no load and the adjacent end surfaces of the elastomer should be less than the volume of elastomer displaced when compressed under full load. The idea is to establish load carrying contact with the ends of the elastomer in such a manner as to avoid stress concentration adjacent the load carrying surfaces.

What is claimed as new is:

1. In a vehicle suspension system, a vehicle frame, an axle and radius rod means for positioning the axle, a spring between the frame and axle consisting essentially of a solid column of incompressible elastomer in compression load carrying relation, said column having a relation between length and cross section which will prevent buckling under compression, supporting and supported members at opposite ends of the column and having load carrying surfaces in opposed relation to each other and projecting radially outside the associated end of the column, at least one of the members being bonded to the associated end of the column, said ends diverging outward from said load carrying surfaces at an acute angle to define a central section between the ends of substantially greater cross sectional area than the cross sectional area of the ends in contact with said members at no load and said elastomer under compression load bulging outward into load carrying contact with said one member outside the outer edge of its bond to said one member, and the volume included between the projection of the central section of the elastomer on each load carrying surface at no load and the outer surface of the associated end at no load being less than the volume of elastomer displaced when the column is compressed under full load.

2. The structure of claim 1 in which the radius rod means comprises leaf springs.

3. The structure of claim 1 in which both members are bonded to the associated end of the column and are fixed respectively to the frame and axle.

References Cited

UNITED STATES PATENTS

| | | | |
|---|---|---|---|
| 2,154,586 | 4/1939 | Stern | 267—63 |
| 2,612,369 | 9/1952 | Mooney | 267—21 X |

FOREIGN PATENTS

| | | |
|---|---|---|
| 1,311,883 | 11/1962 | France. |

PHILIP GOODMAN, Primary Examiner